April 15, 1941. J. D. KITCHENS 2,238,812
BURGLARPROOF LATCH
Filed July 14, 1939
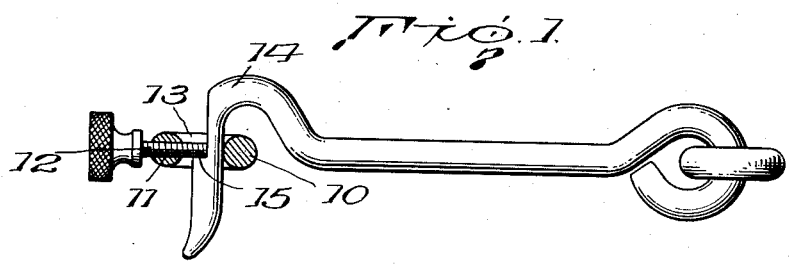
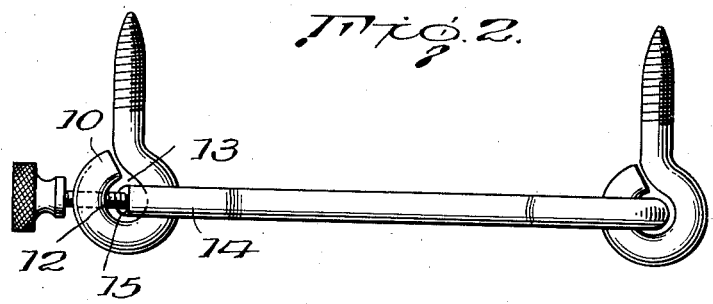
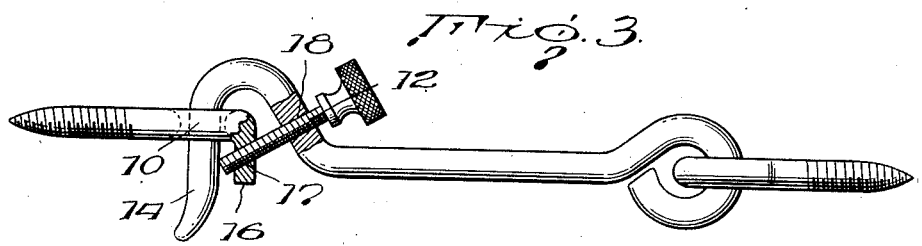
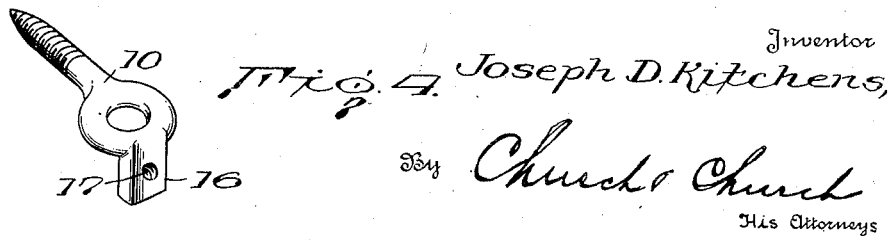
Inventor
Joseph D. Kitchens,
By Church & Church
His Attorneys Patented Apr. 15, 1941

2,238,812

UNITED STATES PATENT OFFICE 2,238,812

BURGLARPROOF LATCH

Joseph D. Kitchens, Fort Worth, Tex.

Application July 14, 1939, Serial No. 284,510

2 Claims. (Cl. 292—105)

This invention relates to improvements in window and door latches, the primary object being to provide a latch that will be burglarproof in that a window or door latched on the inside cannot be opened by anyone at the outside.

A further object of the invention is to provide a latch of the hook and eye type wherein the hook can be locked in the eye in such fashion that it cannot be removed except by a person at the inside of the door or window on which the latch is installed.

More specifically, the invention contemplates a latch comprising an eye member and a hook engageable therein, the hook being capable of being locked in the eye by a locking element engageable with the hook in a recess in the eye. Preferably, the locking element consists of a screw threaded in a recess in the eye member and engageable with the hook for locking the hook in the eye member.

With these and other objects in view, the invention consists in certain details of construction and combinations and arrangements of parts, all as will hereinafter be more fully described and the novel features thereof particularly pointed out in the appended claims.

In the accompanying drawing—

Figure 1 is a side elevational view illustrating the preferred embodiment of the invention wherein the locking screw projects into the eye of the eye member to engage and lock the hook therein;

Fig. 2 is a top plan view of the device illustrated in Fig. 1;

Fig. 3 is an elevational view of a modified form of the device; and

Fig. 4 is a perspective view of the eye member illustrated in Fig. 3.

In the preferred form of the device illustrated in Figs. 1 and 2, the eye member 10 is formed with a threaded opening 11 through which screw 12 is threaded with the end of the screw projecting into the opening 13 of the eye member. Thus, when the hook 14 is engaged in the eye member, the screw 12 can be turned to force the forward end thereof into engagement with the hook. By the screw forcibly engaging the hook, the frictional contact will lock the hook in the eye, but it is preferred that the hook have a shoulder 15 formed thereon, against which the screw 12 can engage to prevent withdrawal of the hook from the eye. In other words, the hook is recessed to form the shoulder 15, so that, when the screw 12 is advanced into engagement with the recessed portion of the hook, the end of the screw will overlie shoulder 15. In accordance with usual practice, the latch is installed on the inner side of the door or window, under which circumstances anyone at the outer side of the door cannot possibly actuate the screw 12 to release the hook.

In the modified form of the invention illustrated in Figs. 3 and 4, the eye member 10 is provided with an offset 16 formed with an opening 17, which is preferably threaded for reception of the screw 12. In this instance, the hook 14 is also provided with a threaded opening 18 for screw 12, the disposition of the openings 17, 18, being such that they will be in alinement when the hook is inserted in the opening 13 in eye member 10. With the openings 17, 18, thus placed in registry with one another, the screw 18 can be threaded through both of said openings so as to lock the hook in the eye. Preferably, as shown, the screw 12 is carried by the hook 14, so that its forward end can be advanced into and retracted from the opening in the offset 16 of the eye member. Here, again, with the latch installed at the inner side of a door or window, it will be inaccessible to anyone at the outer side of the door or window so far as concerns the ability of a person actuating the screw 12 from the outer side of the door or window.

What I claim is:

1. In a latch comprising an eye member and a hook having reversely bent portions one of which is adapted to engage in said eye and the other of which is formed with a threaded opening, an angular offset on said eye member having a threaded opening therein, said threaded openings being movable into registry with each other when the hook is engaged in the eye, and a locking screw threaded through the opening in the hook and through the opening in said offset into engagement with the eye-engaging portion of the hook.

2. In a latch comprising an eye member having an offset at one end thereof with a threaded opening in said offset, a hook having reversely bent portions, one of said reversely bent portions being engageable in said eye with said offset positioned in the space between the reversely bent portions of the hook, and a locking screw carried by the other reversely bent portion of the hook movable into registry with the opening in said offset when the hook is engaged in the eye whereby said screw can be advanced through the opening in the offset to substantially span the space between the reversely bent portions of the hook.

JOSEPH D. KITCHENS.